United States Patent [19]

Galluccio et al.

[11] Patent Number: 4,611,031

[45] Date of Patent: Sep. 9, 1986

[54] PROCESS FOR THE PREPARATION OF A COMPATIBILIZER FOR CONCENTRATED POLYMER BLENDS AND COMPATIBILIZER PRODUCT

[75] Inventors: Richard A. Galluccio, Perkasie; Chung-Yin Lai, West Chester; Christian D. Neveu, Pennllyn, all of Pa.

[73] Assignee: Rohm and Haas Company, Phila, Pa.

[21] Appl. No.: 695,316

[22] Filed: Jan. 28, 1985

[51] Int. Cl.$^4$ .................. C08F 255/04; C08F 255/06; C08F 279/02

[52] U.S. Cl. .................. 525/310; 252/56 R; 525/73; 525/84; 525/309

[58] Field of Search ............................ 525/309, 310

[56] References Cited

U.S. PATENT DOCUMENTS 3,923,930 12/1975 Waldbillig ........................ 525/310
3,981,958 9/1976 Nakashima et al. ................. 525/310

Primary Examiner—Wilbert J. Briggs, Sr.
Attorney, Agent, or Firm—Marc S. Adler

[57] ABSTRACT

A process is provided for the preparation of a graft copolymer compatibilizer useful at low levels for blending with separately prepared olefin copolymers and polymethacrylate polymers to form a stable, concentrated, polymer blend. The polymer blend, as well as the compatibilizer, are useful lubricating oil additives concentrates which contain at least 80 weight percent polymethacrylate segments. The polymer blend may be further diluted with a hydrocarbon oil to form a lubricating fluid. The polymer blend offers the benefit of the thickening power of olefin copolymers, the low temperature viscosity characteristics of polymethacrylates, and is stable for prolonged periods without phase separation.

7 Claims, No Drawings

PROCESS FOR THE PREPARATION OF A COMPATIBILIZER FOR CONCENTRATED POLYMER BLENDS AND COMPATIBILIZER PRODUCT

FIELD OF THE INVENTION

This invention relates to a process for preparing a graft copolymer compatibilizer useful for blending at low concentration with larger amounts of commercially available and separately prepared polymethacrylate and olefin copolymer oil additives to form stable oil additive concentrates. These polymer blend concentrates possess the beneficial performance properties of both polymethacrylate and olefin copolymer types of oil additives. More particularly, the invention relates to a free radical initiated graft polymerization reaction of alkyl methacrylate monomers onto a separately prepared olefin copolymer and the use of the graft copolymer-containing solution formed thereby as a compatibilizer for blending much larger quantities of commercially available and separately prepared polymethacrylates with olefin copolymers. The polymer blend, containing from about 5 to about 15 weight percent of the compatibilizer, based on the total polymer content, and the compatibilizer contains at least 80 weight percent polymethacrylate segments and not more than 20 weight percent olefin copolymer segments on total polymer. The polymer blend containing the compatibilizer is a stable and effective lubricating oil additive concentrate and can be further diluted with hydrocarbons to form lubricating fluids.

BACKGROUND OF THE INVENTION

Both polymethacrylate polymers, referred to herein as "PMAs", and olefin copolymers, referred to herein as "OCPs", are commercially available materials known to be useful as lubricating oil additives. PMAs possess better low temperature viscosity characteristics in lubricating oils than OCPs, and can be used to lower the pour point of lubricating oils, while OCPs cannot. OCPs, however, are more efficient thickeners for lubricating oils than PMAs and, therefore, can be used at lower concentrations in lubricating oils than PMAs to obtain the desired thickening effect.

Attempts have, therefore, been made to combine these two types of polymeric oil additives together to form a product having the beneficial performance properties of each type of additive. Physical blends of PMAs and OCPs in solution, at polymer solids levels of at least 30 weight percent, are not, however, useful as oil additives when either of these types of polymeric additives is present at a concentration of about 5 weight percent or higher. This is due to the thermodynamic incompatibility of PMAs and OCPs with each other in solutions, such as lubricating oils, when they are physically blended together in concentrated form. Incompatibility refers to the separation of the polymers into layers in a solvent, such as mineral oil, when the mixture is stored for a period of time. The separation of the additives into different phases prevents the effective use of the physical blend as a stable, viscosity index improver.

The theoretical aspects of compatible polymer mixtures are discussed in *Heterogeneous Polymer Systems I. Polymer Oil-in-Oil Emulsions*, G. E. Molau, Journal of Polymer Science, Part A, Vol. 3, pp 1267–1278 (1965); *Copolymers, Polyblends and Composites*, Advances in Chemistry Series 142, ACS, Chap. 7 (1975) entitled *Compatibilization Concepts in Polymer Applications*, N. G. Gaylord; and *Polymer Blends*, D. R. Paul and S. Newman, Academic Press, Vol. 2, Chap. 12 (1978), and other articles.

It is known that the presence of block, graft and/or block-graft copolymers, referred to herein in the aggregate simply as "graft copolymers", can be used to alleviate, to some degree, the problem of polymer incompatibility. However, attempts to chemically combine PMAs and OCPs to form stable, compatible polymer blend additives, have been only partially successful. The prior types of compatibilizers, a term used in the art to refer to materials that are useful to some degree to alleviate polymer incompatibility, formed by in situ polymerization techniques, as described in more detail below, are in reality mixtures of the graft, block and/or block-graft copolymers and homopolymers having various configurations and molecular weights. The term "compatibilizer" as used in the present invention refers to graft copolymer solutions prepared according to the process of the invention having polymer portions, referred to herein as "polymer segments", which are similar in chemical structure to the polymers to be blended therewith.

While the theoretical requirement that a graft copolymer compatibilizer should possess polymer segments similar in structure to each of the separately prepared polymers to be blended together to form a stable polymer blend is known, this requirement is not readily accomplished when separately prepared and commercially available PMAs and OCPs are blended together. Prior to the present invention, no process was known for graft polymerizing alkyl methacrylates onto separately prepared OCPs in solution to form a compatibilizer which is useful in minor amounts for blending major amounts of separately prepared and commercially available PMAs and OCPs to form a stable, high solids content polymer blend oil additive.

Although the theoretical possibility of preparing block or graft copolymers which will compatibilize separately prepared mixtures of polymers had been previously postulated, as in *Compatibilization Concepts in Polymer Applications, supra*, page 77, the practice of accomplishing such a result remains highly empirical. This is particularly the case when large amounts of commercially available polymers are to be compatibilized with small amounts of a copolymer compatibilizer. As mentioned above, the common commercial practice has been to form at least one of the polymers, which is desired to be present in the polymer mixture, from its monomers, such as the alkyl methacrylates, in the presence of a separately formed, second polymer such as the olefin copolymer. This in situ polymerization technique relies on the simultaneous production of a large amount of homopolymer of the first type (i.e. polyalkyl methacrylate) at the same time that a graft copolymer formed from monomers of this first type are graft polymerizing onto the second, separately prepared polymer (i.e. OCP). This in situ technique permits matching of the graft polymer segments of the first type polymer with the simultaneously prepared homopolymer of the first type. Since the in situ technique results in graft copolymers having polymer segments of the second type polymer, additonal minor amounts of separately prepared polymers of the second type (i.e. OCP) can be added to the in situ graft copolymer mixture without phase separation (incompatibility). This technique, however, requires polymerizing a large quantity of the monomers of the first type (i.e. alkyl methacrylates) to form a sufficient amount of the homopolymer of this type (i.e. PMA homopolymer) in situ, and does not contemplate the formation of a compatibilizer which can be used at small concentrations for blending larger amounts of commercially available, and separately prepared polymers of both types. The extreme difficulty in matching the polymer segments of a graft copolymer "compatibilizer" with separately prepared and commercially available polymers of both types, to be blended therewith, is believed to be the principal reason why prior workers have settled for the inefficient and unwieldy in situ processes and have avoided addressing the problem of forming a true compatibilizer.

DESCRIPTION OF THE PRIOR ART

The published literature evidences the difficulties encountered in attempting to obtain the performance advantages of both commercially available PMAs and OCPs in a single lubricating oil additive using in situ processes.

U.S. Pat. No. 3,089,832 and corresponding German Auslegeschrift No. 1235491, are directed to the preparation of lubricating oil additives by the ionization radiation initiated, graft polymerization of methacrylate monomers onto polymeric substrates, including various polyolefins, in lubricating oil. These patents teach that relatively high concentrations of the methacrylate monomers in the oil reaction medium promote the formation of long chain polymethacrylates on the polymeric substrate. However, as in the case of polyisobutylene polymer substrates, the patents also disclose that the molecular weight of the resulting graft copolymer is generally lower than the initial molecular weight of the polymer substrate. The reduction in molecular weight of the graft polymer is attributed to the reduction in the molecular weight of the polymer substrate due to the ionizing radiation, presumably by cleavage. According to the compatibility theory, such a reduction in the chain length of the polymer substrate should have an adverse effect on the capability of the resulting graft polymer to compatibilize additional, separately prepared and non-degraded polyolefin polymer.

U.S. Pat. No. 4,149,984 (hereinafter referred to as the '984 patent) is directed to an in situ method for manufacturing a polymer-in-oil solution containing from 50 to 80 weight percent PMA. This polymer-in-oil solution is disclosed as being useful, by itself, as a lubricating oil additive. While the '984 patent teaches the formation of a graft copolymer of the PMA onto OCP in situ, neither the graft polymer nor the polymer-in-oil solution containing the graft polymer are disclosed as being useful as "compatibilizers" to which additional commercially available and separately prepared PMA oil additives can be added.

The '984 patent is silent concerning the ability of the in situ formed graft copolymer solution, produced in the first step of the process, or the final polymer-in-oil solution containing the in situ formed graft copolymer plus additional OCP, to be useful to stabilize additional amounts of commercially available and separately prepared polymethacrylate polymer.

U.S. Pat. No. 4,282,132 expressly recognizes that the process of the '984 patent did not completely satisfy the desired technical requirements because the grafting yield left something to be desired. The '132 patent is directed to a similar free radical initiated in situ graft polymerization process for preparing an oil additive using hydrogenated block copolymers of styrene and a conjugated diene as the backbone polymer and (meth)acrylic acid esters and/or styrene as the first graft and a N-heterocyclic monomer as the second graft (to impart improved dispersancy).

U.S. Pat. No. 4,229,311 is also directed to an improvement to the '984 patent in which dispersant N-heterocyclic grafts are incorporated into the polymer-in-oil solution.

U.S. Pat. No. 4,290,925, assigned to the same assignee as the '984, '132 and '311 patents referred to above, clearly states that combining OCPs and PMAs had still not been commercially solved in a satisfactory manner. The '925 patent is directed to a concentrated polymer emulsion useful as a lubricating oil additive. The emulsion contains an OCP phase dispersed in a poly(meth)acrylate phase along with a vehicle and an emulsifier or stabilizer. The '925 patent teaches that the vehicle, which is principally an ester or higher alcohol, is important to achieve a stabilized, concentrated PMA/OCP additive. The vehicle must act as a good solvent for the poly(meth)acrylate and as a substantially poorer solvent for the OCP. The level of the vehicle in the polymer emulsion is quite high, however, generally from 25 to 80 percent by weight. In addition, in order to maintain stable emulsions for use as oil additives, the amount of the stabilizer must be more than 5 percent and is disclosed as being possibly as high as 100 percent by weight of total polymers in the emulsion.

Other references of interest in this area of PMA and OCP oil additives include U.S. Pat. Nos. 4,388,202; 4,146,489; and 3,506,574.

Accordingly, a need still existed for a fairly simple method for preparing a graft copolymer compatibilizer useful at small amounts for blending with larger amounts of commercially available and separately prepared PMAs and OCPs to form a concentrated, compatible PMA/OCP polymer blend useful as a lubricating oil additive concentrate containing a sufficiently high concentration of PMA to maintain the desired viscosity-temperature characteristics of PMAs and enough OCP to improve the thickening effect of the PMAs in oil.

It is, therefore, an object of the present invention to provide a process for the preparation of a compatibilizer which can be used at low concentrations with commercially available and separately prepared PMAs and OCPs to produce stable PMA/OCP polymer blends which are effective lubricating oil additive concentrates, and to produce the lubricating fluids containing a hydrocarbon oil and the lubricating oil additive concentrate.

SUMMARY OF THE INVENTION

A process is provided for the free radical initiated graft polymerization of methacrylate monomers onto OCP polymers in a solvent to form a "graft copolymer" "compatibilizer" which is useful at low levels for the preparation of concentrated PMA/OCP polymer blend, oil additive concentrates. In addition, the invention is directed to stable lubricating oil additive concentrates and lubricating fluids containing a hydrocarbon oil plus the oil additive concentrate, containing the compatibilizer and commercially available PMA and OCPs, such that the oil additive concentrate and lubricating fluid maintain the viscosity-temperature characteristics of PMAs and the thickening effect of OCPs.

The invention is also directed to the preparation of dispersant and non-dispersant compatibilizers useful with dispersant and non-dispersant PMA/OCP polymer blends to improve the dispersancy of the lubricating oil additive concentrates and lubricating fluids containing the oil additive concentrate.

DETAILED DESCRIPTION OF THE INVENTION

A process is provided for preparing a "graft copolymer", "compatibilizer" useful at low concentrations for the preparation of concentrated polymer blends with commercially available and separately prepared PMA and OCP oil additives. The compatibilizer and polymer blend oil additive concentrates of the invention contain at least 80 wt. % PMA polymer segments and not more than 20 wt. % OCP polymer segments on total polymer solids. The resulting polymer blends are stable upon prolonged storage and possess the performance advantages of both PMA and OCP type oil additives.

The compatibilizer is prepared by the free radical initiated graft polymerization of methacrylate monomers onto a preformed OCP backbone or substrate polymer in a suitable solvent. While the process of the invention for preparing the compatibilizer may result in the formation of a small amount of PMA homopolymer, the object of the process is to form a compatibilizer which can be used at small amounts for blending with large amounts of separately prepared and commercially available PMAs and OCPs. It is not, therefore, an object of the invention to simultaneously form a large quantity of PMA homopolymer along with the compatibilizer in situ so that such a mixture of PMA homopolymer and compatibilizer could be used only for blending additional OCP therewith.

The olefin copolymer (OCP) substrates used to form the compatibilizer, as well as the OCPs used for subsequent blending with the compatibilizer and additional separately formed PMAs, are oil soluble, substantially linear and rubbery in nature. OCPs include well known ethylene-propylene copolymers ("EP"), ethylene-propylene diene modified terpolymers ("EPDM"), or admixtures of EPs and EPDMs, hydrogenated styrene-butadiene and styrene-isoprene copolymers and atactic polypropylene. Other olefinic oil-soluble substrates or substrate polymers which can be rendered oil soluble after grafting, such as for example, low density polyethylene, may also be used in minor amounts. By "minor amounts" we mean less than 50 percent by weight of the backbone polymer charge, and typically from about 5 to about 30 percent by weight of the substrate charge.

The EP copolymers may have a wide range of ethylene to propylene ratios. Above about 80 mole percent ethylene, however, these copolymers become partially crystalline and lose their oil solubility and utility as substrates for use in this invention. Preferably, the ethylene-propylene copolymer substrates contain from about 50 to about 70 mole percent ethylene, have viscosity average molecular weights of about 10,000 to about 200,000, and a $M\overline{w}/M\overline{n}$ (molecular weight distribution) of less than four. Lower propylene contents, higher molecular weights and broader molecular weight distributions can be used, but such copolymers lead to generally less efficient viscosity index ("VI") improvers.

The ethylene-propylene-diene modified terpolymers are well known materials containing low levels, preferably less than 10 percent by weight, of a non-conjugated diene such as for example: 1,4-hexadiene; dicyclopentadiene; or ethylidene norbornene. Maximum ethylene concentration is determined by crystallinity (solubility) with the preferred range being from about 45 to about 65 mole percent ethylene. The preferred viscosity average molecular weight range is from about 10,000 to about 200,000, with a $M\overline{w}/M\overline{n}$ of less than about eight. EPDM terpolymers outside these ranges can be used at some sacrifice in the properties of the final viscosity index improving additive made therewith.

The foregoing olefinic polymers when used as substrates in the preparation of the compatibilizer provide graft copolymers which are good viscosity index improvers and which are capable of being modified to impart dispersancy. Polyolefin substrates outside the above ranges can be used and will provide graft copolymers which can be used in the practice of the invention, but with a sacrifice in VI improvement.

In order to effectively handle commercially available OCP additives to prepare the compatibilizer, the highly viscous nature of these rubbers require their dilution with a solvent. It is preferred to use the highest possible solids content OCP solution which can be handled in the preparation of the compatibilizers of the invention. Typically the concentration of the OCP in solvent will range from about 5 to about 20 percent by weight. The higher the OCP concentration in the final compatibilizer solution, the higher will be the amount of solvent present in the graft polymerization reaction. As the amount of solvent in the graft polymerization reaction mixture is increased, for a given methacrylate monomer charge, the lower the concentration of the methacrylate monomer in the reaction solution will be, and the more difficult it will be to obtain a compatibilizer to match the subsequently blended, commercially available, separately prepared PMAs and OCPs. The difficulty in matching is also believed to be caused, in part, by increased chain transfer reactions in certain solvents. A balance between the maximum olefin copolymer concentration in the solvent which can be effectively handled, the desired degree of grafting, and the molecular weight of the graft copolymer necessary to form a compatibilizer for blending with highly concentrated commercially available and separately prepared PMAs and OCPs must, therefore, be reached.

The methacrylic acid ester (methacrylate) monomers useful for preparing the compatibilizer are known materials formed from alcohols having 1 to 22 carbon atoms such that the polymer is oil soluble. The methacrylate monomer must be capable of forming a polymer which is soluble in oils, such as mineral oil, in the absence of the olefinic copolymer substrate. This is necessary in order for the methacrylate polymer segment of the graft compatibilizer to stabilize subsequently blended and separately prepared PMA oil additive polymers in oil. Typically, the methacrylate monomers are formed from mixtures of these alcohols. Preferably, the methacrylate monomers used to form the compatibilizer are selected from a methacrylate mixture closely corresponding to the composition of the commercial, separately prepared PMAs to be compatibilized.

We have found that the interaction parameter (x) of the compatibilizer fraction in solvent and the separately prepared and commercially available PMA fraction, to be blended therewith, in solvent should preferably be as close to each other as possible. A difference in the interaction parameters of less than about 0.05 between the compatibilizer fraction in solvent and the subsequently blended PMA fraction in solvent will result in compatible polymer blends.

The methacrylate monomers may optionally include minor amounts of additional comonomers which will copolymerize with the methacrylates during the polymerization reaction. "Minor amounts" of such additional monomers refers generally to comonomers amounting to less than 10 percent by weight of the methacrylates. These comonomers may include alkyl acrylates and styrene as known in the art. In order to form a compatibilizer having at least 80 percent by weight PMA polymer segments and no more than 20% by weight olefin copolymers, the concentration of the methacrylate monomers in the polymerization mixture should range from about 45 to about 60 weight percent.

Additional comonomers having polar groups such as polymerizable nitrogen-containing heterocyclic compounds, can be incorporated in the methacrylate monomer feed to impart dispersancy to the compatibilizer. Alternatively, these dispersant monomers may be incorporated onto the preformed OCP substrate used to prepare the compatibilizer, or onto the OCP to be blended with the compatibilizer and PMA, according to the graft polymerization process of U.S. Pat. No. 4,146,489. The polar monomers provide dispersancy to the compatibilizer and/or the polymer blend. The amount of polar monomer incorporated in the compatibilizer to obtain dispersancy can range from about 0.5 to about 10 percent by weight based on the total methacrylate monomers including the optional additional comonomers, and preferably from about 1 to about 4 percent by weight of the monomers.

In order to incorporate the necessary amount of polar monomer in the compatibilizer to obtain dispersancy, when desired, the concentration of the polar monomer should range from about 0.5 to about 10 weight percent based on the amount of alkyl methacrylate monomers. The preferred polar, dispersant monomer used in the practice of this invention is N-vinyl-pyrrolidinone; however, polar C-vinyl-pyridines may be used, such as 2-vinyl-pyridine, 4-vinyl-pyridine, and lower alkyl ($C_1$–$C_8$) substituted C-vinyl-pyridines such as: 2-methyl-5-vinyl-pyridine, 2-methyl-4-vinyl-pyridine, 2-vinyl-5-ethyl-pyridine, and 2-vinyl-6-methylpyridine. Other polar nitrogen containing monomers may be used in minor amounts with N-vinyl-pyrrolidinone or the C-vinyl-pyridines. These monomers include dimethylamino ethyl methacrylate or acrylate, vinyl-imidazole, N-vinyl-carbazole, N-vinyl-succinimide, acrylonitrile, o-, m-, or p-aminostyrene, maleimide, N-vinyl-oxazolidone, N,N-dimethyl aminoethyl-vinyl-ether, ethyl-2-cyano acrylate, vinyl-acetonitrile, N-vinylphthalimide, and 2-vinylquinoline; a variety of acrylamides and methacrylamides such as N-(1,1-dimethyl-3-oxobutyl) acrylamide, N-(1,2-dimethyl-1-ethyl-3-oxobutyl) acrylamide, N-(1,3-diphenyl-1-methyl-3-oxopropyl) acrylamide, N-(1-methyl-1-phenyl-3-oxobutyl) methacrylamide, N,N-diethyl aminoethyl acrylamide, and 2-hydroxyethyl acrylamide. A variety of N-vinyl-caprolactams or their thioanalogs; other than or in addition to N-vinyl-pyrrolidone, may be used in minor amounts. These include N-vinyl-thio-pyrrolidone, 3-methyl-1-vinyl-pyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone, 3,4,5-trimethyl-3-ethyl-1-vinyl-pyrrolidone, and other lower alkyl substituted N-vinyl-pyrrolidones. vinyl-benzyldimethyl-amine, N-dimethyl aminopropyl acrylamide and methacrylamide, N-methacryloxyethyl pyrrolidinone, N-methacryloxy ethyl morpholine, N-maleimide of dimethylamino propylamine, and the N-methacrylamide of aminoethyl ethylene urea. "Minor amounts" of these polar monomers means less than 50 percent by weight of the heterocyclic monomer charge, for example, about 10–30 percent by weight of this charge.

Any free radical source capable of hydrogen abstraction may be used as an initiator for the graft polymerization reaction used to prepare the compatibilizer. Examples are alkylperoxy esters, alkyl peroxides, alkyl hydroperoxides, diacyl peroxides and the like. While t-butyl-peroctoate is the preferred initiator, other suitable initiators include t-butyl-perbenzoate, di-t-butyl peroxide, t-butyl-hydroperoxide, cumene hydroperoxide, or benzoyl peroxide. Any mixture of such initiators may be used. The concentration of the initiator can range from about 0.1 to about 0.5 weight percent based on the weight of the methacrylate monomer and hydrocarbon backbone polymer, while concentrations of from about 0.125 to about 0.25 weight percent are preferred in the practice of the invention. The concentration of the initiator is dependent on the specific initiator used and the temperature of the polymerization.

While the preferred temperature range for the grafting reaction ranges from about 80° C. to about 150° C., the preferred temperature range, as recognized by those skilled in this art, is in part a function of the choice of the free radical initiator. The reaction may be conducted over a wider temperature range of, for example, from about 60° C. to about 175° C., as long as care is taken to choose an appropriate initiator. With the preferred initiator, t-butyl peroctoate, the most preferred polymerization temperature range is from about 100° C. to about 115° C.

Any solvent in which: the methacrylate monomers and optional comonomers; the separately prepared OCP polymer substrate; the initiator; and the graft copolymer-containing compatibilizer reaction product, are soluble may be used. These solvents include aliphatic hydrocarbons, aromatic hydrocarbons, including mineral oil, chlorinated hydrocarbon solvents and the like.

The compatibilizer product of the free radical initiated graft polymerization reaction is a solvent solution having a solids content of at least about 40 percent by weight. The upper limit on the solids content of the compatibilizer is a function of the limitations of current polymerization equipment. With presently available equipment, this upper limit is about 60 percent by weight. While the exact composition of the compatibilizer solution has not been determined, it is believed that it is a mixture of the graft copolymer of PMA onto OCP, ungrafted PMA homopolymer and trace amounts of unpolymerized methacrylate monomer and ungrafted OCP, in solvent. The overall composition of the compatibilizer contains from about 5 to no more than 20 percent by weight OCP polymer segments and from about 95 to not less than 80 weight percent PMA polymer segments, and preferably from about 85 to 95 percent by weight PMA polymer segments and from about 15 to about 5 percent by weight OCP polymer segments on total polymer solids. The viscosity of the compatibilizer solution must be greater than about 8000 centistokes at 100° C. for a compatibilizer solution containing from about 40 to about 60 percent polymer solids, and preferably from about 16,000 centistokes to about 25,000 centistokes at 100° C. for compatibilizer solutions containing from about 45 to about 55 percent by weight polymer solids. Compatibilizer solutions having a viscosity below 8000 centistokes at 100° C. at about 50 percent by weight polymer solids result in reduced storage stability for highly concentrated PMA/OCP polymer blends containing low levels of the compatibilizer and an overall PMA polymer segment content of at least 80 weight percent. Compatibilizer solutions having viscosities above about 45,000 centistokes at 100° C. at about 50 percent by weight polymer solids as well as polymer blends of PMAs and OCPs containing such compatibilizers can be used, however, the shear stability may be poorer than desirable.

It is known that when polymeric viscosity index improvers are subjected to the severe mechanical stresses of operating equipment, the polymers may be degraded thus diminishing the viscosity of a lubricant. Polymers which resist this tendency to degrade mechanically in service are said to be shear stable. The ability of viscosity index improvers to resist mechanical degradation with use is dependent on a number of factors, one of which is molecular weight. A very high molecular weight polymer, although initially imparting high viscosity to the solution, will be very substantially degraded in service and thus will lose much or nearly all of its effect. If graft compatibilizers having high moledular weights and viscosities are blended with much lower molecular weight, separately prepared, PMAs and OCPs, stable polymer blends can be prepared, but the blends may suffer to some extent, in shear stability, because of the high molecular weight of the compatibilizer in the blend.

As indicated above, this shear stability problem derives in part from the technology and manufacturing processes employed in the rubber industry, in particular by the producers of ethylene propylene copolymers and terpolymers. Such polymers are routinely made at very high molecular weight so that the products will be relatively hard solids and, therefore, more easily transported. When these rubbers are prepared with molecular weights appropriate for use as VI improvers, the polymers are very sticky solids, which flow or "creep" even at ambient temperatures. Although technology is available to process these polymers to lower molecular weights, as in the oxidative degradation processes of U.S. Pat. Nos. 3,404,091 and 3,687,849, special handling is required and the processing is slower, resulting in higher costs. Therefore, when conventional EP rubbers are used as the substrate for the preparation of the compatibilizer or for blending therewith and with PMAs to form the polymer blend oil additive concentrates, the products may be too high in molecular weight to provide acceptable shear stability.

Another factor adversely affecting the shear stability of the compatibilizers and polymer blends of the invention is a result of the thickening which takes place during the graft polymerization. This thickening likely results from crosslinking that may occur as a part of the reaction, especially when dispersant polar comonomers are employed. Therefore, in order to obtain optimum dispersancy for the compatibilizer and the polymer blends containing either a dispersant compatibilizer or dispersant OCP polymer in the blend, some compromise in shear stability is necessary.

Means to bring the molecular weight down into the desirable range, that is, to where shear stability will be good, are readily available. It requires only mechanical or thermal degradation of the product subsequent to the grafting reaction, or reactions, to adjust the molecular weight or viscosity to the preferred range.

After the compatibilizer solution has been prepared, and degraded if necessary, the compatibilizer can then be used to form compatible blends of PMA and OCP using conventional mixing techniques.

The concentration of the compatibilizer in the PMA/OCP polymer blend ranges from about 5 to about 20 percent by weight on total polymers, with from about 10 to about 15 percent being preferred. At use levels above about 20% by weight compatibilizer on total polymers, the shear stability of the polymer blend may begin to suffer. In addition, the compatibilizer of the invention may be blended separately with either separately prepared and commercially available PMAs or OCPs. This allows the compatibilizer to be blended with both PMA and OCP at one time or to be blended with one separately prepared polymer for shipment to another location where the other separately prepared polymer can be blended therewith if desired. The overall PMA/OCP polymer segment composition of the polymer blend, containing the compatibilizer and the additional, separately prepared and added PMAs and OCPs in solvent contains at least 80 weight percent PMA polymer segments and not more than 20 weight percent OCP polymer segments on total polymer solids.

We have also found that the degree of polymerization of the alkyl methacrylate monomers or their percent conversion has an important effect on the storage stability of the polymer blends containing the compatibilizer. When the alkyl methacrylate conversion is less than about 90%, polymer blends of PMA, OCP and compatibilizer are not storage stable. "Storage stability" as used herein is defined according to the test procedure defined herein below. As the monomer conversion is increased to from about 92% to about 98% or higher, the storage stability polymer blends containing the compatibilizer is significantly increased. Example 13 and Table V demonstrate the importance of a high percent monomer conversion to polymer for the compatibilizer and polymer blends in terms of their storage stability.

Both low and high molecular weight, separately prepared PMAs can be blended with the graft compatibilizer and the separately prepared and added OCPs in oil, according to the invention. Low molecular weight PMAs on the order of less than about 200,000 weight average molecular weight are suitable pour point depressant additives for lubricating oils, however, they have limited effectiveness as viscosity index improving additives. High molecular weight PMAs on the order of at least about 350,000 weight average molecular weight, are effective viscosity index improving and pour point depressing oil additives. The compatibilizers of the present invention are capable of stabilizing polymer blends containing either high or low molecular weight polymethacrylates as long as the overall composition and viscosity of the compatibilizer is within the defined ranges. The compatibilizer, the compatibilizer blended with either separately prepared PMA or separately prepared OCP, or concentrated polymer blends containing the compatibilizer and additional separately prepared PMA and OCP, can be used directly as stable lubricating oil additive concentrates, or each of these products may be further diluted in a hydrocarbon oil to form a lower solids content lubricating fluid.

The following procedure describes the tests used to determine the stability of the concentrated polymer blend oil additive concentrates and their dispersancy activity.

STABILITY TEST

This test measured the efficiency of the compatibilizer to form stable PMA/OCP polymer blends in oil. The storage stability of the PMA/OCP polymer blends prepared according to the invention were determined using an oven stability test. The temperature conditions of the stability test are important variables in concluding whether a blend is "stable". Storage of the blends at higher temperatures may lead to unstable solutions more quickly than if the polymer blend solution is stored at lower temperatures. A polymer blend in oil was prepared by mixing from 5 to about 20 weight percent of the compatibilizer, based on total polymers, with a mixture of separately prepared PMA and OCP at 100° C. for 3 hours to form a blend having a ratio of 85 to 15 percent by weight PMA to OCP polymer segments. Thirty milliliters of the polymer blend in oil was then placed in a vial and stored in an 80° C. oven for three months or until phase separation was evident by visual inspection. When no phase separation was observed, the sample was physically separated into a top portion and a bottom portion. Each portion was then evaluated for its PMA/OCP polymer segment ratio, refractive index, haze, thickening power, shear stability, pour point and bulk viscosity. Any portion which did not change its thickening power, pour point efficiency and shear stability by more than about 5 percent from the original values of the overall sample after a period of three months was considered to be acceptable as a "stable" oil additive concentrate.

ASPHALTENES DISPERSANCY TEST

A method for determining the dispersing activity of any given polymer was based on the capacity of the polymer to disperse asphaltenes in a typical mineral oil. The asphaltenes were obtained by oxidizing a naphthenic oil with air under the influence of a trace of iron salts as catalyst, such as ferric naphthenate. The oxidation was desirably accomplished at 175° C. for approximately 72 hours by passing a stream of air through a napththenic oil to form a sludge which may be separated by centrifuging. The sludge was freed from oil (extracting it with pentane). It was then taken up with chloroform and the resulting solution was adjusted to a solids content of 2% (weight by volume).

When the polymer was to be examined for its dispersing activity, it was dissolved in a standard oil, such as solvent extracted 100 neutral oil. Blends may be prepared to contain percentages varying from 2% to about 0.01% or even lower of the polymer in oil.

A 10 ml sample of a blend was treated with 2 ml of the standard solution of asphaltenes in chloroform. The sample and reagent were thoroughly mixed in a test tube and the tube was placed in a forced draft oven at 150° C. The tube was then allowed to cool and the appearance of the sample was noted.

If a polymer has dispersing activity, the oil will appear clear although colored. Experience has demonstrated that, unless a polymer exhibits dispersing activity, at concentration below about 2% in the above test, it will fail to improve the engine cleanliness of engine parts in actual engine tests. The results are expressed as the percent polymer required to disperse the asphaltenes.

The following examples are provided to illustrate the invention. All percentages are by weight, unless otherwise stated.

EXAMPLE 1

Preparation of Dispersant Compatibilizer and Polymer Blend

Compatibilizer

To a 5 liter, three-necked flask equipped with stirrer, thermometer, and condenser with attached adapter for maintaining a nitrogen atmosphere, was charged 666.7 g of 15% solids low molecular weight ethylene/propylene copolymer solution in oil ($\overline{Mw}$=100,000 with ethylene content of 45 weight %, and viscosity at 210° F. 1050 mm$^2$/sec). Then 889.0 g of methacrylate ester monomer mixture was added along with 1.02 g of t-butyl-peroctoate. The mixture was then stirred at room temperature for 30 minutes. The stirred mixture was then heated to 88° C. and stirred at 88° C. for 3 hours. A solution of 1.02 g t-butyl-peroctoate in 10 g of 100 neutral was then added all at once to the heated reaction mixture. The mixture was then agitated for another 1 hour and a mixture of 36 g of N-vinyl-pyrrolidinone and 374 g 100 neutral oil was then added to the mixture. The mixture was then stirred for 15 minutes to ensure adequate mixing and then a second solution of 1.53 g of t-butyl-peroctoate in 10 g of 100 neutral oil was added, the stirred mixture was then heated to 115° C. over a 45 minute interval and maintained this temperature for another 30 minutes. A third solution of 1.02 g t-butyl-peroctoate in 10 g of 100 neutral oil was then added and the stirred mixture was maintained at 115° C. for another 30 minutes. The reaction was then considered complete.

The compatibilizer polymer solution so formed contained 47.9% solids in mineral oil and was slightly cloudy. The polymer concentrate had viscosity of 22,000 cSt at 210° F.

Polymer Blend

The product obtained according to the above procedure, containing the PMA/OCP graft copolymer was then used as a compatibilizer for the preparation of stabilized PMA/OCP dispersions oil additive concentrate as follows:

The following components were thoroughly mixed at 100° C. for 3 hours.

35.4 g: compatibilizer (47% solids)
100 g: Olefin Copolymer (15% solids, $\overline{Mw}$=100,000)
162 g: Polymethacrylate polymer (49% solids, $\overline{Mw}$=350,000)
2.7 g: 100 N oil A turbid, viscous dispersion was obtained. Viscosity of the dispersion was 1800 cSt at 210° F.

The following presents the results of tests performed on the compatibilizer and polymer blend oil additive concentrate formed.

| APPLICATION RESULTS CHARACTERISTICS | Compatibilizer | Polymer Blend |
|---|---|---|
| Bulk viscosity 210° F. cSt (ASTM-D-445) | 22,000 | 1,800 |
| solids content % | 47.9 | 37.0 |
| Blending Efficiency | 31.2 | 16.0 |

-continued

| APPLICATION RESULTS CHARACTERISTICS | Compatibilizer | Polymer Blend |
|---|---|---|
| (ASTM-D-445), cSt[1] | | |
| Shear Stability | | |
| Sonic SSI (ASTM-D-2603) | 50.6 | 20 |
| Bosch SSI (ASTM-D-3945) | 57.6 | 30 |
| % polymer showing Asphaltenes Dispersancy | 0.50 | 0.25 |
| Oven stability, days | >99 | >90 |

[1]Blending efficiency hereinafter referred to as "BE" is the viscosity of a 10% bulk polymer in 200 N mineral oil (6.4 cSt) at 100° C. as measured by ASTM-D-445. The higher the BE the more effective the thickening performance of the additive solution.

EXAMPLE 2

Preparation of Dispersant Compatibilizer and Polymer Blend

Compatibilizer

A mixture of 333.3 g of low molecular weight ethylene/propylene copolymer solution in oil (15% solids, $\overline{Mw}=100,000$ with ethylene content of 45 weight %, and viscosity at 210° F. of 1060 mm²/sec.) was charged to a reaction vessl. 441.5 g of methacrylate ester monomer mixture was then added to the vessel and the mixture stirred at room temperature for 15 minutes. The stirred mixture was then heated to 105° C. and a solution of 0.64 g to t-butyl-peroctoate solution in 33 ml of mineral oil was then fed uniformly over a period of 4 hours to the heated mixture. A solution of 0.51 g of t-butyl-peroctoate in 5 g of 100 neutral oil was then fed all at once to the reaction mixture. The mixture was agitated for another 60 minutes and 18 g of N-vinyl-pyrrolidinone was then added. The mixture was stirred for 15 minutes to ensure adequate mixing and a second solution of 0.77 g of t-butyl-peroctoate in 5 g of 100 neutral oil was added. The resulting mixture was then heated to 115° C. and maintained with agitation at 115° C. for another 30 minutes. A third solution of 0.51 g t-butyl-peroctoate in 5 g of 100 neutral oil was then added and the stirred mixture was maintained at 115° C. for another 30 minutes.

139.8 g of 100 neutral oil was then added to the reaction mixture to adjust the theoretical solids to 50% and stirred for 30 minutes at 115° C. The reaction was then considered complete.

The compatibilizer polymer solution so formed contained 48.1% solids in mineral oil and was slightly cloudy. The polymer concentrate had viscosity of 16,800 cSt at 210° F.

Preparation of Polymer Blend

To a reaction vessel was charged a mixture of 35.4 g of the compatibilizer polymer concentrate prepared according to the above procedure, 100 g of OCP solution (15% solids with ethylene contents of 45% and $\overline{Mw}=100,000$ and viscosity at 210° F. is 1060 mm²/sec.), 2.7 g of 100 neutral oil, and 162 g of polyalkylmethacrylate polymer solution ($\overline{Mw}=350,000$, 49% solids, and viscosity of 1,500 mm²/sec at 210° F.). The resulting mixture was thoroughly mixed at 100° C. for 3 hours.

A turbid, viscous dispersion was obtained. The polymer content of the emulsion was 37% and a viscosity at 210° F. of 1690 cSt. The following presents the results of the test performed on the compatibilizer and polymer blend oil additive concentrate.

| APPLICATION RESULTS CHARACTERISTICS | Compatibilizer | Polymer Blend |
|---|---|---|
| Bulk viscosity 210° F. cSt (ASTM-D-445) | 16,800 | 1,690 |
| solids content % | 48.1 | 37.0 |
| BE | 28.6 | 15.7 |
| Shear Stability | | |
| Sonic SSI (ASTM-D-2603) | 45.7 | 17 |
| Bosch SSI (ASTM-D-3945) | 53.4 | 26 |
| % polymer showing Asphaltenes Dispersancy | 0.25 | 0.25 |
| Oven stability, days | >99 | >90 |

EXAMPLE 3

Preparation of Compatibilizer and Polymer Blend

Compatibilizer

To a reaction vessel was charged a mixture of 417 g of 15% solids low molecular weight ethylene/propylene copolymer solution in oil ($\overline{Mw}=100,000$ with ethylene content of 45 weight % and viscosity at 210° F. of 1050 mm²/sec). Then 428.4 g of methacrylate ester monomer mixture was added. The mixture was stirred at room temperature for 15 minutes. The stirred mixture was then heated to 115° C. and a solution of 0.64 g t-butyl-peroctoate solution in 20 ml of mineral oil was then uniformly fed over a period of 4 hours. A solution of 0.51 g t-butyl-peroctoate in 5 g of 100 neutral oil was then added all at once to the reaction mixture and the mixture was agitated for another 60 minutes followed by the addition of 17.5 g of N-vinyl-pyrrolidinone. This mixture was stirred for 15 minutes to ensure adequate mixing and then a second solution of 0.77 g of t-butyl-peroctoate in 5 g of 100 neutral oil was added thereto. The resulting mixture was heated to 115° C. and the agitation was maintained at 115° C. for another 30 minutes. A third solution of 0.51 g t-butyl-peroctoate in 5 g of 100 neutral oil was then added and the stirred mixture was maintained at 115° C. for another 30 minutes.

103 g of 100 neutral oil was then added to the reaction mixture to adjust the theoretical solids to 50% and the mixture was stirred for 30 minutes at 115° C. The reaction was then considered complete.

The compatibilizer polymer solution so formed contained 48.9% solids in mineral oil and was slightly cloudy. The polymer concentrate had viscosity of 17,700 cSt at 210° F.

Polymer Blend

To a reaction vessel was charged a mixture of 100 g of OCP solution (15% solids with ethylene contents of 45% and $\overline{Mw}=100,000$), 40 g of 100 neutral oil, and 122 g of polyalkylmethacrylate polymer solution ($\overline{Mw}=350,000$ and viscosity at 210° F. was 5000 mm²/sec). The resulting mixture was thoroughly mixed at 100° C. for 1.5 hours. 35.4 g graft copolymer solution was then added and the mixture was agitated under the same conditions for another 1.5 hours.

A turbid, viscous dispersion was obtained. The polymer content of the emulsion was 37% with a viscosity at 210° F. of 1700 cSt. The following presents the results of the tests performed on the compatibilizer and polymer blend.

| APPLICATION RESULTS CHARACTERISTICS | Compatibilizer | Polymer Blend |
|---|---|---|
| Bulk viscosity 210° F. | 17,700 | 1,700 |

-continued

| APPLICATION RESULTS CHARACTERISTICS | Compatibilizer | Polymer Blend |
|---|---|---|
| cSt (ASTM-D-445) | | |
| solids content % | 48.9 | 37.0 |
| BE | 28.9 | 15.6 |
| Shear Stability | | |
| Sonic SSI (ASTM-D-2603) | 44.6 | 16 |
| Bosch SSI (ASTM-D-3945) | 52.4 | 25 |
| % polymer showing Asphaltenes Dispersancy | 0.25 | 0.25 |
| Oven stability, days | >99 | >90 |

EXAMPLE 4

Preparation of Compatibilizer and Polymer Blend

Compatibilizer

To a one gallon reaction vessel was added a mixture of 800 g of 15% solids low molecular weight ethylene/propylene copolymer solution in oil ($\bar{Mw}$=100,000 with ethylene content of 45 wt. % and viscosity at 210° F. of 1060 mm$^2$/sec), 1054.6 g of methacrylate ester monomer mixture along with a solution of 1.23 g of t-butyl-peroctoate in 6 g of 100 neutral oil. The mixture was stirred at room temperature for 15 minutes. The stirred mixture was then heated to 92° C. and stirred at 92° C. for 2 hours. A solution of 1.23 g of t-butyl-peroctoate in 12 g of 100 neutral oil was then added all at once to the reaction mixture. The mixture was agitated for another 1 hour followed by the addition of 43.2 g of N-vinyl-pyrrolidinone. The mixture was then stirred for 15 minutes to ensure adequate mixing and a second solution of 1.84 g of t-butyl-peroctoate in 12 g of 100 neutral oil was then added. The stirred mixture was then heated to 115° C. over a 30 minute interval and this temperature was maintained for another 30 minutes. A third solution of 1.23 g t-butyl-peroctoate in 12 g of 100 neutral oil was then added and the stirred mixture was maintained at 115° C. for another 30 minutes.

454.7 g of 100 neutral oil was then added to the reaction mixture to adjust the theoretical solids to 50% and stirred for 30 minutes at 115° C. The resulting polymer solution had viscosity of 28,600 cSt at 210° F. (47.0% solids). The compatibilizer polymer so formed was then subjected to mechanical degradation at 8,000 PSI in a homogenizer to adjust the viscosity of the resulting compatibilizer product to 16,500 cSt at 210° F.

Polymer Blend

A mixture of 35.4 g of the homogenized compatibilizer polymer concentrate solution prepared via the above procedure, 100 g of OCP solution (15% solids with ethylene contents of 45% and $\bar{Mw}$=100,000), 2.7 g of 100 neutral oil, and 162 g of polyalkylmethacrylate polymer solution ($\bar{Mw}$=350,000 and viscosity at 210° F. was 1500 mm$^2$/sec at 49% solids) was charged to a reaction vessel. The resulting mixture was thoroughly mixed at 100° C. for 3 hours.

A turbid, viscous dispersion was obtained. The polymer content of the emulsion was 37% with a viscosity at 210° F. was 1630 cSt. The following presents the results of the tests performed on the compatibilizer and polymer blend.

| APPLICATION RESULTS CHARACTERISTICS | Compatibilizer | Polymer Blend |
|---|---|---|
| Bulk viscosity 210° F. cSt (ASTM-D-445) | 16,500 | 1,630 |

-continued

| APPLICATION RESULTS CHARACTERISTICS | Compatibilizer | Polymer Blend |
|---|---|---|
| solids content % | 47.0 | 37.0 |
| BE | 29.5 | 15.4 |
| Shear Stability | | |
| Sonic SSI (ASTM-D-2603) | 48.4 | 17.4 |
| Bosch SSI (ASTM-D-3945) | 55.7 | 27.1 |
| % polymer showing Asphaltenes Dispersancy | 0.25 | 0.125 |
| Oven stability, days | >99 | >90 |

EXAMPLE 5

Non Dispersant Compatibilizer and Polymer Blend

Compatibilizer

A mixture of 333.3 g of 15% solids low molecular weight ethylene/propylene copolymer solution in oil ($\bar{Mw}$=100,000 and viscosity at 210° F. of 1030 mm$^2$/sec) was charged to a reaction vessel. 456.6 g of methacrylate ester monomer mixture was then added and the mixture stirred at room temperature for 15 minutes. The stirred mixture was then heated to 95° C. and a solution of 0.64 g of t-butyl-peroctoate solution in 22 ml of mineral oil was fed uniformly over a period of 4 hours to the mixture. A solution of 0.51 g t-butyl-peroctoate in 5 g of 100 neutral oil was then added all at once to the reaction mixture. The mixture was agitated for another 60 minutes followed by the addition of the chaser t-butyl-peroctoate solutions twice at every 30 minute interval.

174.2 g of 100 neutral oil was then added to the reaction mixture to adjust the theoretical solids to 50% and the mixture was stirred for 30 minutes at 115° C. The reaction was then considered complete.

The compatibilizer polymer solution so formed contained 48.3% solids in mineral oil and was slightly cloudy. The polymer concentrate (compatibilizer) had viscosity of 22,000 cSt at 210° F.

Polymer Blend

A mixture of 35.4 g of the polymer concentrate solution prepared via the above procedure, 100 g of OCP solution (15% solids with ethylene contents of 45 weight % and $\bar{Mw}$=100,000), 2.7 g of 100 neutral oil, and 162 g of polyalkylmethacrylate polymer solution (49% solids $\bar{Mw}$=350,000 and viscosity at 210° F. was 1500 mm$^2$/sec) was charged to a reaction vessel. The resulting mixture was thoroughly mixed at 100° C. for 3 hours.

A turbid, viscous dispersion was obtained. The polymer content of the emulsion was 37% with a viscosity at 210° F. of 1700 cSt. The following presents the results of the tests performed on the compatibilizer and polymer blend.

| APPLICATION RESULTS CHARACTERISTICS | Compatibilizer | Polymer Blend |
|---|---|---|
| Bulk viscosity 210° F. cSt (ASTM-D-445) | 22,000 | 1,700 |
| solids content % | 48.3 | 37.0 |
| BE | 30.9 | 15.8 |
| Shear Stability | | |
| Sonic SSI (ASTM-D-2603) | 49.4 | 19 |
| Bosch SSI (ASTM-D-3945) | 56.6 | 28 |
| % polymer showing Asphaltenes Dispersancy | not tested | 0.50 |
| Oven stability, days | >99 | >90 |

EXAMPLE 6

Styrene/Isoprene Compatibilizer and Polymer Blend

SIP Compatibilizer

To a 2 liter, three-necked flask equipped with stirrer, thermometer, and condenser with attached adapter for maintaining a nitrogen atmosphere, was charged 75 g of styrene/isoprene (SIP) copolymer (50 weight % styrene), 175 g of 100 neutral oil, and 374.0 g of methacrylate ester monomer mixture. The resulting mixture was heated to 100° C. for 2 hours. Upon the completion of SIP dissolution, a mixture of 0.61 g of t-butyl-peroctoate in 25 g of 100 neutral oil and 43 g of methyl methacrylate was added. The mixture was stirred at 100° C. for 1 hour followed by the addition of a solution of 0.51 g t-butyl-peroctoate in 25 g of 100 neutral oil all at once to the reaction mixture. The mixture was agitated for another 1 hour followed by the addition of 17 g of N-vinyl-pyrrolidinone. The mixture was stirred for 15 minutes to ensure adequate mixing followed by the addition of a second solution of 0.51 g of t-butyl-peroctoate in 25 g of 100 neutral oil. The stirred mixture was heated to 115° C. over a 10 minute interval and maintained this temperature for another 30 minutes. A third solution of 0.51 g t-butyl-peroctoate in 25 g of 100 neutral oil was then added to the mixture and the stirred mixture was maintained at 115° C. for another 30 minutes.

238.8 g of 100 neutral oil was then added to the reaction mixture to adjust the theoretical solids to 50% and the mixture was stirred for 30 minutes at 115° C. The reaction was then considered complete.

The compatibilizer polymer solution so formed contained 49.3% solids in mineral oil and was cloudy. The polymer concentrate had viscosity of 19,400 cSt at 210° F.

Polymer Blend

To a reaction vessel was charged a mixture of 23.7 g SIP compatibilizer polymer concentrate solution prepared via the above procedure, 100 g of OCP solution (15% solids with ethylene contents of 45 weight %, $\overline{Mw}=90,000$ and viscosity of 950 mm$^2$/sec at 210° F.), 3.3 g of 100 neutral oil, and 173 g of polyalkylmethacrylate polymer solution ($\overline{Mw}=350,000$ and viscosity of 1500 mm$^2$/sec at 210° F., with 49% solids). The resulting mixture was thoroughly mixed at 100° C. for 3 hours.

A turbid, viscous dispersion was obtained. Polymer content of the emulsion was 37% with a viscosity at 210° F. of 1300 cSt. The SIP compatibilizer and polymer blend was then tested and the results are shown below.

| APPLICATION RESULTS CHARACTERISTICS | Compatibilizer | Polymer Blend |
|---|---|---|
| Bulk viscosity 210° F. cSt (ASTM-D-445) | 19,400 | 1,300 |
| solids content % | 49.3 | 37.0 |
| BE | 36.8 | 16.3 |
| Shear Stability | | |
| Sonic SSI (ASTM-D-2603) | 55.2 | 21 |
| Bosch SSI (ASTM-D-3945) | 63.8 | 31 |
| % polymer showing Asphaltenes Dispersancy | 0.50 | 0.50 |
| Oven stability, days | >99 | >90 |

EXAMPLE 7

EPDM Compatibilizer and Polymer Blend

Compatibilizer

To a 2 liter reactor equipped as described above, charged 343.2 g of predissolved (15% solids) EPDM terpolymer with a diene content of 5 weight % ($\overline{Mw}=135,000$), and 452.6 g of methacrylate ester monomer mixture. The resulting mixture was heated to 100° C. A solution of 0.62 g of t-butyl-peroctoate in 5.2 g oil was then added to the mixture followed by stirring of the mixture at 100° C. for 1 hour. A solution of 0.52 g of t-butyl-peroctoate in 5 g of 100 neutral oil was then added all at once to the reaction mixture. The mixture was then agitated for another 1 hour and 18.6 g of N-vinyl-pyrrolidinone was then added followed by stirring for 15 minutes to ensure adequate mixing. A second solution of 0.52 g of t-butyl-peroctoate in 5 g of 100 neutral oil was then added and the stirred mixture was heated to 115° C. over a 10 minute interval and maintained this temperature for another 30 minutes. A third solution of 0.51 g t-butyl-peroctoate in 5 g of 100 neutral oil was then added to the heated, stirred mixture and stirring was maintained at 115° C. for another 30 minutes.

162.6 g of 100 neutral oil was then added to the reaction mixture to adjust the theoretical solids to 50% and stirred for 30 minutes at 115° C. The reaction was then considered complete.

The compatibilizer polymer solution so formed contained 47.8% solids in mineral oil and was cloudy. The polymer concentrate had viscosity of 16,000 cSt at 210° F.

Polymer Blend

To a reaction vessel was charged a mixture of 35.4 g of the compatibilizer polymer concentrate solution prepared via the above procedure, 100 g of OCP solution (15% solids with ethylene contents of 45 weight % and $\overline{Mw}=100,000$ and viscosity of 1060 mm$^2$/sec at 210° F.), 2.7 g of 100 neutral oil, and 162 g of polyalkylmethacrylate polymer solution ($\overline{Mw}=350,000$). The resulting mixture was thoroughly mixed at 100° C. for 4 hours.

A turbid, viscous dispersion was obtained. The polymer content of the emulsion was 37% with a viscosity at 210° F. of 1650 cSt. The following presents the results of the tests performed on the compatibilizer and polymer blend.

| APPLICATION RESULTS CHARACTERISTICS | Compatibilizer | Polymer Blend |
|---|---|---|
| Bulk viscosity 210° F. cSt (ASTM-D-445) | 16,000 | 1,650 |
| solids content % | 47.8 | 37.0 |
| BE | 28.8 | 15.7 |
| Shear Stability | | |
| Sonic SSI (ASTM-D-2603) | 45.7 | 17 |
| Bosch SSI (ASTM-D-3945) | 53.4 | 26 |
| % polymer showing Asphaltenes Dispersancy | 0.50 | 0.25 |
| Oven stability, days | >99 | >90 |

EXAMPLE 8

Preparation of Compatibilizer and Polymer Blend

Compatibilizer

To a 1 liter, three-necked flask equipped with stirrer, thermometer, and condenser with attached adapter for maintaining a nitrogen atmosphere, was charged 30 g of ethylene/propylene copolymer ($\overline{Mw}=150,000$), 170 g of 100 neutral oil, and 237.8 g of methacrylate ester monomer mixture. The resulting mixture was heated to 100° C. for 1 hour. Upon the completion of EP dissolution, a mixture of 0.61 g of t-butyl-peroctoate in 3 g of oil and 26 g of methyl methacrylate was added. The mixture was stirred at 100° C. for 1 hour, followed by the addition of a solution of 0.31 g t-butyl-peroctoate in 3 g of 100 neutral oil all at once to the reaction mixture. The mixture was then agitated for another 1 hour followed by the addition of 10.7 g of N-vinyl-pyrrolidinone. The mixture was then stirred for 15 minutes to ensure adequate mixing and a second solution of 0.46 g of t-butyl-peroctoate in 3 g of 100 neutral oil was then added. The stirred mixture was heated to 115° C. over a 15 minute interval and maintained this temperature for another 30 minutes. A third solution of 0.31 g t-butyl-peroctoate in 5 g of 100 neutral oil was then added and the stirred mixture was maintained at 115° C. for another 30 minutes.

47 g of 100 neutral oil was then added to the reaction mixture to adjust the theoretical solids to 56% and stirred for 30 minutes at 115° C. The reaction was then considered complete.

The compatibilizer polymer solution contained 49% solids in mineral oil and was cloudy. The polymer concentrate had viscosity of 23,600 cSt at 210° F.

Polymer Blend

To a reaction vessel was charged a mixture of 17.7 g of the compatibilizer polymer solution prepared via the above procedure, 50 g of OCP solution (15% solids with ethylene contents of 45 weight %, $\overline{Mw}=100,000$ and viscosity of 1050 mm²/sec at 210° F.), 1.4 g of 100 neutral oil, and 81 g of polyalkylmethacrylate polymer solution ($\overline{Mw}=50,000$). The resulting mixture was thoroughly mixed at 100° C. for 4 hours.

A turbid, viscous dispersion was obtained. The polymer content of the emulsion was 37% with a viscosity at 210° F. was 1820 cSt. The following presents the results of the tests performed on the compatibilizer.

| APPLICATION RESULTS CHARACTERISTICS | Compatibilizer |
|---|---|
| Bulk viscosity 210° F. cSt (ASTM-D-445) | 23,600 |
| solids content % | 49 |
| % polymer showing Asphaltenes Dispersancy | 1.00 |
| Oven stability, days | >99 |

COMPARATIVE EXAMPLE 9

Low Molecular Graft Copolymer Solution and Unstable Polymer Blend

To a reaction vessel was charged a mixture of 336.2 g of 15% solids low molecular weight ethylene/propylene copolymer solution in oil ($\overline{Mw}=90,000$ with 45 weight % ethylene). 443.6 g of methacrylate ester monomer mixture was then added along with 0.76 g of t-butyl-peroctoate solution. The mixture was stirred at room temperature for 15 minutes. 60% of the resulted mixture was then transferred to an additional vessel while the remainder of the monomer mixture was heated in the reactor to 100° C. As soon as the temperature in the reaction vessel reached 100° C., the remaining 60% of the monomer mixture was uniformly fed into the reactor over a period of 1 hour. A solution of 0.51 g t-butyl-peroctoate in 5 g of 100 neutral oil was then added all at once to the reaction mixture. The mixture was agitated for another 60 minutes followed by the addition of 18 g of N-vinyl-pyrrolidinone. The mixture was stirred for 15 minutes to ensure adequate mixing followed by the addition of a second solution of 0.51 g of t-butyl-peroctoate in 5 g of 100 neutral oil. The stirred mixture was then heated to 115° C. over a 5 minute interval and maintained at this temperature for another 30 minutes. A third solution of 0.51 g t-butyl-peroctoate in 5 g of 100 neutral oil was then added and the stirred mixture was maintained at 115° C. for another 30 minutes.

184.9 g of 100 neutral oil was then added to the reaction mixture to adjust the theoretical solids to 50% and stirred for 30 minutes at 115° C. The reaction was then considered complete.

The graft polymer solution so formed contained 47% solids in mineral oil and was slightly cloudy. The polymer concentrate had viscosity of 6,100 cSt at 210° F.

Polymer Blend

To a reaction vessel was charged a mixture of 35.4 g of the graft polymer solution prepared via the above procedure, 100 g of OCP solution (15% solids with ethylene contents of 45 weight % and $\overline{Mw}=90,000$ and viscosity of 950 mm²/sec at 210° F.), 2.7 g of 100 neutral oil, and 162 g of polyalkylmethacrylate polymer solution ($\overline{Mw}=350,000$). The resulting mixture was thoroughly mixed at 100° C. for 4 hours.

A turbid, viscous dispersion was obtained. The polymer content of the emulsion was 37% with the viscosity at 210° F. was 1160 cSt.

The following presents the results of the test performed on the graft polymer solution and polymer blend, which clearly shows that the graft copolymer solution was not effective as a compatibilizer for preparing a stable PMA/OCP polymer blend.

| APPLICATION RESULTS CHARACTERISTICS | Compatibilizer | Polymer Blend |
|---|---|---|
| Bulk viscosity 210° F. cSt (ASTM-D-445) | 6,100 | 1,160 |
| solids content % | 47.0 | 37 |
| BE | 22.3 | 14.7 |
| Shear Stability | | |
| Sonic SSI (ASTM-D-2603) | 32.2 | 16.0 |
| Bosch SSI (ASTM-D-3945) | 43.0 | 20.0 |
| % polymer showing Asphaltenes Dispersancy | 0.50 | 0.25 |
| Oven stability, days | >99 | 28 |

EXAMPLE 10

Low Temperature Viscosity Performance at Low Shear Rate

The low temperature viscosity characteristics as measured by the borderline pumping temperature (BPT) (ASTM-D-3809) of a stable polymer blend (85% PMA/15% OCP) prepared according to the process of the invention was compared with commercially available OCP and PMA and PMA/OCP (70% PMA/30% OCP) concentrate in a SAE 10W-40 SF/CC formulation. The concentration of each oil additive in the base stock, containing the same detergent inhibitor package was adjusted to obtain the same kinematic viscosity at 100° C. (14.0 cSt). The results are shown in Table I.

TABLE I

| Additive | BPT, °C.[1] |
|---|---|
| Polymer Blend PMA/OCP of Invention | −29/−30 |
| OCP | −26/−28 |
| PMA | −31/−33 |
| PMA/OCP Concentrate (70/30) | −28/−29 |

[1]Results of duplicate testing.

This table indicates that the polymer blend of the invention possesses better low temperature performance characteristics than a conventional OCP additive and PMA/OCP concentrate, and only a slightly poorer than a conventional PMA additive.

EXAMPLE 11

Low Temperature Viscosity Performance at High Shear Rate

The low temperature viscosity characteristics of the 85/15 PMA/OCP polymer blend of the invention was compared with a conventional PMA additive and a 70/30 PMA/OCP concentrate in an SAE 10W-40 oil containing 6% of an API SF/CC detergent inhibitor package. The results are shown in Table II.

TABLE II

| | PMA | PMA/OCP (70/30) Concentrate | PMA/OCP 85/15 of Invention |
|---|---|---|---|
| % Polymer Concentrate in Oil | 10.6 | 7.5 | 10.1 |
| Kinematic viscosity of SAE 10W-40 oil (ASTM-D-445) containing polymer additive | 15.42 | 15.0 | 14.76 |
| CCS, poises[1] | 33.0 | 32.8 | 33.2 |
| Ratio 100/150[2] | 78/28 | 18/82 | 52/48 |
| BPT, °C. (ASTM-D-3809) | 32.8 | −29.2 | −30.6 |
| SSP, °C.[3] | −35 | −35 | −35 |

[1]CCS is Cold Cranking Simulator viscosity at −20° C. as determined by SAE J300, Sep. '80
[2]Ratio 100/150 is ratio of mineral oil of 100 N grade and 150 N grade in order to obtain viscometrics set forth above i.e. CCS.
[3]SSP is determined by Federal Test Method 203 cycle C.

This test demonstrates that the PMA/OCP polymer blend has a lower contribution to CCS viscosity than a straight PMA additive permitting the use of the PMS/OCP blends in heavier base stocks. This usually provides better engine cleanliness and reduced engine oil consumption.

EXAMPLE 11

High Temperature, High Shear Rate Performance

TABLE III

| | PMA | PMA/OCP 85/15 (EXAMPLE 2) | PMA/OCP 85/15 (EXAMPLE 6) | PMA/OCP (70/30) CONCENTRATE |
|---|---|---|---|---|
| % Polymer Concentrate in oil | 8.44 | 7.65 | 8.64 | 6.30 |
| KV[1] at 100° C., cSt | 14.03 | 14.07 | 14.02 | 14.01 |
| KV at 150° C., cSt | 6.28 | 6.14 | 5.94 | 5.78 |
| cPo at 100° C., $10^6$ sec$^{-1}$ | NA | 8.76 | 8.65 | NA |
| cPo at 150° C., $10^6$ sec$^{-1}$ | 4.0 | 3.92 | 3.87 | 3.82 |
| Bosch, SSF (ASTM-D-3945) | 28.0 | 28.0 | 30.3 | 23 |

[1]KV is Kinematic Viscosity (as defined in Table I).

This test demonstrated that the PMA/OCP polymer blends of the invention can provide essentially the same contribution to the high temperature, high shear rate, viscosity of an engine oil as a PMA additive.

EXAMPLE 12

Blending Efficiency at 100° C. and in the Cold Cranking Simulator

The concentrations of the 85/15 PMA/OCP polymer blend of the invention and of a commercial OCP, PMA and PMA/OCP concentrate were adjusted in 100 neutral solvent refined oils, containing 7.3% of a commercial API SF/CC detergent inhibitor package, to reach 14.5±0.1 cSt at 100° C. (ASTM-D-445). The percent polymer solids necessary to reach this viscosity are shown in Table IV along with the results of the measurement of dynamic viscosity at −20° C. using the cold cranking simulator (SAE J-300 September '80). The CCS viscosity, in poise, is correlated with the speed at which an engine can be cranked at low temperature. The lower the CCS viscosity, the higher the cranking speed of the engine.

TABLE IV

| | PMA | OCP | PMA/OCP BLEND OF INVENTION 85/15 | PMA/OCP (70/30) CONCENTRATE |
|---|---|---|---|---|
| % polymer solids | 5.56 | 2.12 | 4.13 | 3.73 |
| KV at 100° C., cSt | 14.39 | 14.52 | 14.55 | 14.48 |
| CCS at −20° C., Po | 24.8 | 19.1 | 23.9 | 19.3 |

The results indicate that the PMA/OCP polymer blend of the invention has a much better blending efficiency at 100° C. than conventional PMA while showing a lower contribution to the cold cranking viscosity.

EXAMPLE 13

Storage Stability and Monomer Conversion

The following presents the average of numerous accelerated storage stability tests at 100° C. performed on 85 wt. % PMA/15 wt. % OCP polymer blends of the invention containing 10 and 15 percent by weight compatibilizers prepared in accordance with the examples. The degree of alkyl methacrylate monomer conversion was correlated with the number of days it took for the polymer blend containing each compatibilizer to separate into two phases. The results are shown in Table V.

TABLE V

| Accelerated Storage Stability Test | | | |
|---|---|---|---|
| Wt. % Compatibilizer in 85/15 PMA/OCP Polymer Blend | Separation, days Conversion of Monomers | | |
| | Low[1] | Medium[2] | High[3] |
| 10 | 10 | 15 | 28 |

TABLE V-continued

| Wt. % Compatibilizer in 85/15 PMA/OCP Polymer Blend | Accelerated Storage Stability Test Separation, days Conversion of Monomers | | |
|---|---|---|---|
| | Low[1] | Medium[2] | High[3] |
| 15. | 24 | 29 | 65 |

[1]Low equals a monomer conversion greater than about 90 wt. % and less than 92.5 wt. %.
[2]Medium equals a monomer conversion greater than 92.5 wt. % and less than 95 wt. %.
[3]High equals a monomer conversion greater than 95 wt. %.

The results clearly show that regardless of the concentration of compatibilizer in the polymer blend, the storage stability increases as the monomer conversion is increased. Ten percent of a compatibilizer having a high degree of monomer conversion is about as stable as 15 percent of a compatibilizer having a medium conversion level. Further, an increase in monomer conversion of from about 92.5-95 wt. % to greater than about 95 wt. % results in nearly doubling the stability time regardless of the compatibilizer concentration.

What is claimed is:

1. A process for preparing a mineral oil soluble compatibilizer for polymer blends of olefin copolymer and polymethacrylate oil additives comprising:

forming a reaction solution by intimately admixing in a solvent:

(a) an oil soluble hydrocarbon backbone polymer;

(b) at least one alkylmethacrylate monomer capable of forming a mineral oil soluble polymer in the absence of the hydrocarbon backbone polymer; and (c) a free radical initiator capable of hydrogen abstraction, where the concentration of said backbone polymer in said solvent is from about 5 to about 20 percent by weight, said free radical initiator being present at a concentration of from about 0.1 to about 0.4 percent by weight of said admixed components, and said monomers being present at a concentration of at least 80 weight percent on said admixed components, and graft polymerizing said reaction solution at a temperature of from about 60° C. to about 175° C. until the viscosity of the reaction solution is at least 8000 centistokes at 100° C., the polymer solids content of said reaction solution ranges from about 40 to about 60 percent by weight, and the weight percent conversion of monomers is greater than about 90 percent to form said mineral oil soluble compatibilizer which will stabilize a mixture of separately prepared PMA and OCP oil additive polymers comprising at least 80 weight percent PMS polymer segments and not more than 20 weight percent OCP polymer segments.

2. The compatibilizer prepared according to the process of claim 1 comprising at least 80 percent by weight polymethacrylate segments and no more than 20 percent by weight olefin copolymer segments.

3. The compatibilizer prepared according to claim 1 where the oil soluble hydrocarbon backbone polymer is selected from the group consisting of ethylene-propylene copolymer, ethylene-propylene-diene modified terpolymer, styrene-isoprene copolymer and styrene-butadiene copolymer.

4. A compatibilizer for blending separately prepared polymethacrylate oil additives and olefin copolymer additives comprising a mineral oil soluble graft copolymer-containing solution comprising at least 80 percent by weight mineral oil soluble polymethacrylate polymer segments, said polymethacrylate polymer segments being soluble in mineral oil in the absence of said olefin copolymer segments, and not more than 20 percent by weight olefin copolymer segments, a polymer solids content of from about 40 to about 60 percent by weight, a viscosity of at least 8000 centistokes at 100° C., and a degree of conversion of alkylmethacrylate monomers to said mineral oil soluble polymer segments of at least 90 weight percent.

5. The compatibilzer of claim 4 comprising at least 85 percent by weight mineral oil soluble polymethacrylate segments and not more than 15 percent by weight olefin copolymer segments, a polymer solids content of from about 45 to about 55 percent by weight and a viscosity of from about 16000 to about 25000 centistokes at 100° C.

6. The compatibilizer of claim 5 further comprising a degree of conversion of alkylmethacrylate monomers to mineral oil soluble polymer of greater than about 95 weight percent.

7. The process of claim 1 wherein said solvent is a lubricating oil.

* * * * *